Aug. 12, 1969        J. D. McGREGOR ET AL        3,460,758
COOLING LINERS FOR ROCKET THRUST NOZZLE
Filed Nov. 16, 1966

INVENTOR.
JAMES D. MCGREGOR
RICHARD E. CORDER
BY
*Edward E. McCullough*

AGENT 3,460,758
COOLING LINERS FOR ROCKET
THRUST NOZZLE
James D. McGregor, Logan, Utah, and Richard E. Corder, Monroeville, Pa., assignors to Thiokol Chemical Corporation, Bristol, Pa., a corporation of Delaware
Filed Nov. 16, 1966, Ser. No. 594,788
Int. Cl. B64d 33/04; F02k 1/24
U.S. Cl. 239—127.1                    4 Claims

ABSTRACT OF THE DISCLOSURE

A cooling liner for convergent-divergent, hollow-cone, rocket nozzles, the liner having annuli of solid, refractory material axially stacked alternately with annular, refractory, porous matrices made of tiny, welded-together spheres with solid coolant filling the spaces between them.

---

Figure 1:
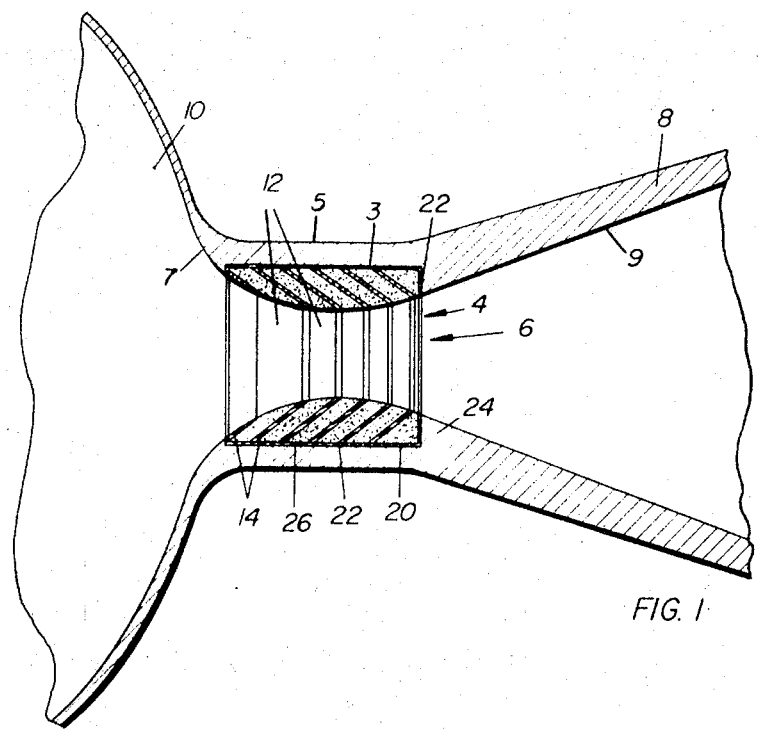

This invention relates to improvements in thrust nozzles for jet propelled vehicles; and, more specifically, it relates to cooling apparatus for thrust nozzles of rockets.

In rocket technology, it is well known that thrust is a function of the energy and quantity of particles expelled during a unit of time through a thrust nozzle, which is related to the rate and temperature at which propellant is consumed. Currently the development of high-energy fuels has progressed somewhat beyond the development of materials for inert parts that are exposed to the high temperature and erosive atmosphere created by combustion of such fuels. This is particularly true of materials in the throat section of the thrust nozzle, which is exposed to what are probably the most extreme conditions of temperature, high-velocity, erosiveness, and sonic vibration that exist anywhere in a rocket. Combustion products of solid propellants are ordinarily extremely erosive because of the presence therein of very hard, solid particles of material such as aluminum oxide. Heretofore, the throat portion of the thrust nozzle has been an annulus of tungsten, a material considered to be optimal in refractory properties and availability. However, when certain new fuels are used, the tungsten annulus tends to lose its dimensional integrity; and, hence, ceases to function in a predictable manner.

Previous attempts to provide cooling apparatus for rockets have all introduced new problems brought about by excessive weight, complexity of apparatus, or insufficient duration of cooling effects. Liquid injectants for cooling rocket nozzles have generally involved the use of moving parts subject to failure when exposed to high temperatures, and heavy tanks of coolant. Cooling apparatus of the protective film type, wherein a solid material is melted and/or vaporized and forced out of orifices to protect rocket parts from combustion gases, have generally been unable to provide uniform protection for the parts involved or to provide cooling effects of practical duration. This is primarily due to insufficient capacity for coolant material and an absence of control over the rate of its release.

The present invention is essentially a cooling liner for a rocket nozzle, comprising a solid, coolant material in a porous, refractory matrix, reinforced with structural members that also function as shields to protect the matrix from erosion.

Objects of the invention are to provide a cooling apparatus for a rocket nozzle that imparts a minimal weight penalty to the nozzle, cooling effects of long duration. Also it insures integrity of critical dimensions, notwithstanding the high velocity, erosive atmosphere passing therethrough.

Important features of the invention are: (1) the structure of the refractory matrix permits a maximum content of solid coolant therein; (2) the rate at which the melted coolant is released to the surface of the matrix may be controlled within limits; (3) refractory shields protect the matrix from erosion; (4) cooling action results from changes of state in the coolant from solid to liquid as well as from liquid to vapor; and (5) a coolant is chosen having a melting point commensurate with the refractory properties of the matrix and shields so that full advantage of those properties is realized before cooling action is employed.

Other objects, features, and advantages of the invention will become apparent as the following detailed description is read with reference to the accompanying drawings, wherein the same parts are designated with identical characters throughout the views.

Figure 2:
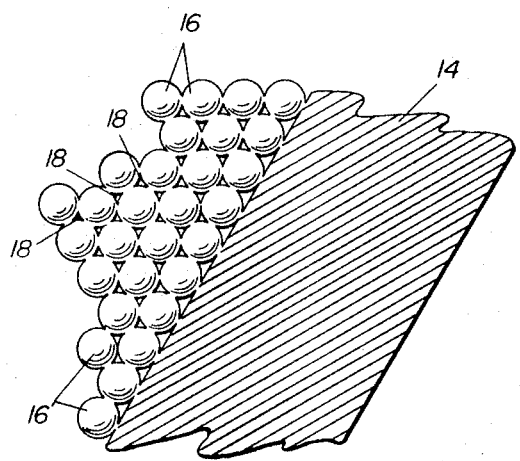

In the drawings:

FIGURE 1 is a sectional view of the invention and adjacent parts of the thrust nozzle of a typical rocket; and FIGURE 2 is a greatly enlarged portion of FIGURE 1 showing matrix detail.

As shown in FIGURE 1, the preferred form of the invention comprises an annular throat section 4 defining a throat orifice 6 of a thrust nozzle 8 for a typical, solid propellant rocket motor 10. The throat section 4 is seated in a recess 3 in the annular nozzle member 5 between the convergent cone 7 and the divergent cone 9 therein. The annulus 4 includes a series of annular, porous tungsten matrices 12 having the forms of hollow, truncated cones. The matrices 12 are separated by solid tungsten shields 14, also having the forms of hollow, truncated cones. The matrices 12 and the shields 14 are convergent in a down stream direction relative to gas flow through the nozzle 8, and each shield 14 is located upstream of a corresponding adjacent matrix 12. Hence, the shields 14 not only impart structural strength to the assembly but also protect the matrices 12 from the erosive gases passing through the throat 6. The matrices 12 are made of tiny spheres 16 of tungsten welded together and welded to the shields 14 (see FIGURE 2). Interstices between the spheres 16 are filled with a solid coolant 18 such as cartridge brass comprising approximately 70% copper and 30% zinc by weight. Hence, the matrices 12 act as reservoirs for the coolant 18. The entire assembly of matrices and shields is aligned to form a throat section 20 for the thrust nozzle 8, and surfaces 22 that form interfaces with adjacent parts 24 of the thrust nozzle 8 are covered with a thin coating 26 of solid tungsten to prevent flowing of the coolant 18 into adjacent parts 24 when it is melted by hot gases of the rocket.

The preferred form of the invention described is made by placing alternate masses of tungsten spheres 16, approximately 100 microns in diameter or smaller, and tungsten shields 14 into an annular, thin walled, titanium container, not shown, having the approximate form desired for the finished throat section 20 and lined with brass. Air is exhausted from the titanium container to leave a hard vacuum therein. It is then sealed and placed under temperature and pressure sufficient to weld the spheres 16 and shields 14 into an integral, porous mass, wherein the matrices 12 have a density approximately 78% of that of solid tungsten. This may be accomplished by 4,000 p.s.i. at 2,700° F. for three hours. During this process the brass lining will melt and will completely fill the interstices between the spheres 16. Also during this process, the entire mass will shrink somewhat, because the spheres 16 become fused together at points of mutual contact. Hence, the original titanium container must be larger than the finished throat section 20. The titanium container is removed from the resulting product by machining, after which a coating 26 of solid tungsten is integrally formed on the surfaces 22, that are to be interfaced with adjacent parts of the nozzle, by vapor-deposit techniques well known in the art.

In operation, hot gases passing through the throat orifice 6 at sonic velocity first melt the brass coolant 18 and then cause it to vaporize at the surface of the orifice 6. Hence, heat conducted into the throat section 20 is absorbed by two successive changes of state in the brass coolant 18. The throat section 20 is provided by a film of melted brass and/or the thin layer of vaporized brass, brought to the surface of the throat orifice 6 by capillary action in the matrices 12 and vapor pressure in the melted brass 18.

Design parameters for the throat section 20 are selected primarily on the basis of (1) the temperature at which cooling action becomes necessary (2) the desired rate of expenditure of the coolant, and (3) the required duration of the cooling action. The size of the spheres 16 is selected to produce a limited metering effect upon the rate at which the coolant is used—smaller spheres tend to slow this process by providing a more labyrinthine path to the surface of the throat section 20 for the melted brass 18. The coolant 18 is chosen to have a melting point such that cooling action in the throat section 20 occurs only after maximum advantage has been taken of the refractory properties thereof. The degree of welding of the spheres 16, i.e. the density of a resulting matrix 12 relative to that of the solid material, is determined so that the matrix 12 may contain a maximum amount of coolant 18 and yet be strong enough (together with the shields 14) to maintain the dimensional integrity of the throat section 20 during operation. The number of shields 14 and the thicknesses thereof are chosen for minimum total weight of the throat section 20 v. adequate protection for the matrices 12 from erosive gases passing therethrough.

Although the preferred form of the invention has been presented with considerable specifity with regard to detail, such details may be altered considerably without departing from the inventive concepts set forth and defined in the appended claims. For example it is obvious that, with slight modification, the essential structure of the invention may be adapted for use in other parts of a rocket nozzle and need not be restricted for use in the throat portion thereof. Also, other coolants such as cooper and silver may be used for specific applications.

What is claimed is:

1. A cooling liner for a convergent-divergent, hollow-cone, rocket thrust nozzle comprising:
    a porous annulus made of mutually-welded, refractory-metal spheres having interstices between them;
    solid coolant in said interstices having a lower melting temperature than that of said annulus, whereby said coolant may be caused by propulsive gases of said rocket to transpire in metered fashion through said interstices to form a protective layer on the exposed surface of said matrix; and
    an annular, refractory metal shield welded to said porous annulus and upstream thereof in said nozzle, to protect said porous annulus from erosion.

2. The cooling liner of claim 1 further including a non-porous, refractory coating on surfaces of said cooling liner that are interfacial with adjacent parts of said nozzle, whereby said coolant, when melted, is prevented from flowing into said adjoining parts.

3. The cooling liner of claim 1 wherein said annular, refractory shield and said porous annulus are hollow, truncated, cones convergent in a downstream direction relative to the flow of propulsive gases when lining said nozzle.

4. In a rocket nozzle having an annular nozzle member, the inside surface of which defines a convergent cone and a divergent cone with an annular recess therebetween, a throat section seated in said recess comprising:
    a plurality of annular, refractory metal shields, each having the form of a hollow, truncated cone convergent downstream relative to the flow of propulsive gases through said nozzles;
    a plurality of annular, porous, refractory metal matrices, each having the form of a hollow, truncated cone convergent in a downstream direction, each being downstream of a respective one of said shields and fitting therein, and each said matrix being made of masses of refractory metal spheres mutually welded and each matrix welded to adjacent shields;
    a solid coolant in said pores of said matrices; and
    a refractory coating on the surfaces of said throat section that are interfacial with said annular recess to prevent flowing of melted coolant into adjacent parts.

References Cited

UNITED STATES PATENTS

| | | |
|---|---|---|
| 3,022,190 | 2/1962 | Feldman. |
| 3,137,995 | 6/1964 | Othmer et al. _____ 239—127.1 X |
| 3,153,320 | 10/1964 | Prosser _____ 239—127.1 X |
| 3,156,091 | 11/1964 | Kraus. |
| 3,177,658 | 4/1965 | Eastman. |
| 3,248,874 | 5/1966 | Grina _____ 239—265.15 X |
| 3,253,785 | 5/1966 | Watanabe _____ 239—265.15 |
| 3,281,079 | 10/1966 | McAlexander et al. __ 239—127.3 |
| 3,282,421 | 11/1966 | Prosser et al. _____ 239—127.3 |
| 3,353,359 | 11/1967 | Webb _____ 239—127.3 X |

EVERETT W. KIRBY, Primary Examiner

U.S. Cl. X.R.

60—200; 239—265